May 10, 1932. R. N. KIRCHER 1,857,459
VALVE FOR COOKERS
Filed May 7, 1928
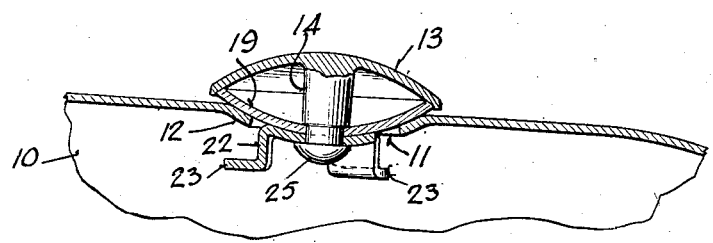
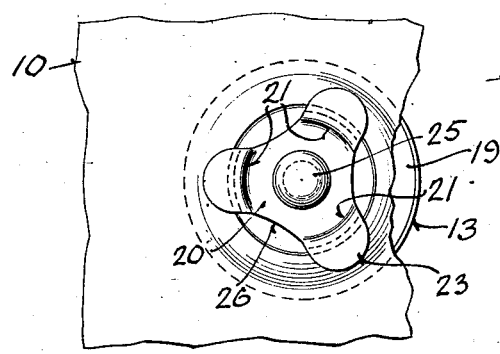
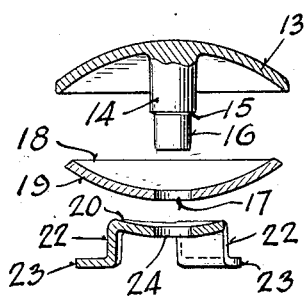
INVENTOR.
RALPH N. KIRCHER
BY
ATTORNEYS.
WITNESS:

Patented May 10, 1932

1,857,459

UNITED STATES PATENT OFFICE

RALPH N. KIRCHER, OF WEST BEND, WISCONSIN, ASSIGNOR TO WEST BEND ALUMINUM COMPANY, OF WEST BEND, WISCONSIN, A CORPORATION OF WISCONSIN

VALVE FOR COOKERS

Application filed May 7, 1928. Serial No. 275,735.

The invention relates to valves for cooking vessels, it comprising a valve of improved construction, whereby a more efficient operation is achieved.

As is well known, these valves respond automatically to steam pressure generated within the cooker, so as to allow the steam to escape from the vessel during the operation of cooking, thus acting as a vent for the steam, and closing automatically, when the pressure is relieved.

The cover of the vessel is provided with a concave depression, and the closure member is provided with a convex lower surface, which is adapted to be seated snugly in the concavity. The concavity in the cover is perforated centrally, and in the opening thus formed, a retaining member for the closure member is adapted as a guide in the vertical movements of the closure member, to limit the upward movement of the closure member while being operated to permit the escape of the steam.

The closure member is constructed as a unit of three parts, in the assembly of which it is secured permanently in operative relation to the cover.

The constructional features of the invention will now be described, and the novelty thereof pointed out in the appended claims.

In the accompanying drawings:

Figure 1 is a vertical sectional view through a portion of the cover of a cooking vessel and of the valve co-operating therewith.

Fig. 2 is a view of the valve, looking upwardly in Fig. 1.

Fig. 3 is a vertical central sectional view through the three elements of the unit forming the closure member of the valve, the said parts being shown as separated, to give a clearer understanding of their construction.

In the drawings, the numeral 10 indicates a portion of the cover of a cooking vessel, the top of which is perforated as at 11. The metal in the margin of the perforation is depressed as at 12 to form a concave seat. The closure member of the valve is comprised of a top portion 13, convexed on its upper side, and is provided preferably with an integral stud 14, projecting from its lower side. The stud is reduced in diameter at the circular shoulder 15, and the projecting lower end 16 is adapted to pass through a central opening 17 of the second portion 18 of the closure member, the latter being provided with a convex lower surface 19, which is contoured to correspond with the concave seat in the cover, and adapted to be seated with the convex surface in the concavity in the cover. A disc 20 is cut out marginally so as to provide a plurality of radial extensions 21. The latter are bent downwardly from the plane of the disc so as to provide a series of legs 22, standing approximately in vertical planes. The lower ends of the legs are outturned as at 23. The extreme diameter across the legs 22 is a little less than the diameter of the perforation 11 in the cover 10, and the extreme diameter across the outward extensions is a little more than that of the said perforation. The disc 20 is provided with a slight depression in its top, conforming to the convex lower surface of the part 18, and is provided with a central opening 24, through which the reduced end 16 of the stud 14 is adapted to be passed.

In the assembly of the parts shown in Fig. 3, the reduced end 16 of the stud is passed through the perforation 17 in the lower section 18, the circular rim of the latter section closely engaging the circular rim of the upper section 13. In such position the shoulder 15 on the stud 14 abuts the lower section 18. The two parts thus assembled are placed in the valve seat 12, and the disc 20, shaped as previously described is applied by passing the opening 24 therein over the projecting reduced end of the stud. The free end of the latter is then upset, as at 25, Fig. 1, to constitute the parts as a fixed unitary structure.

The legs 22, standing in approximately vertical planes serve to guide the closure member in its movements, and the extensions 23 act to limit the extent of such movements. The diameter of the disc 20 may be further reduced as at the points 26, between the extensions 21, to permit free passage of the steam when the closure member is lifted.

In the normal operation of the device, the closure member remains in its seat, until the temperature inside the vessel reaches about 213° F. At this point, the valve device will respond to the pressure within, the steam generated in the vessel acting upon the exposed lower surface of the closure member through the cut-away marginal portions 26 of the disc 20 of the retaining member will lift the closure member, permitting the escape of the steam. With the exhaust of the latter, the closure device resumes its normal position, but will respond to further expansive pressures within.

I have shown the sections 13 and 18 of the closure member as of concavo-convex cross sectional structure, inasmuch as such construction conduces to lightness of the closure device and makes it more sensitive in operation.

Having thus described my invention, what I claim and desire to secure by Letters Patent of the United States, is:

1. A cover for a cooking vessel having in the top thereof a concave depression forming a valve seat with a centrally located through aperture therein, in combination with a closure member normally resting in the said seat, the said closure member being constituted of two concavo-convex sections meeting at their rims, one of the said sections carrying a stud by means of which the other is united thereto, to form the closure member as a light, hollow body, and means attached to the closure member to retain it in operative position with relation to the cover, and means for connecting the said guiding means to the hollow closure member.

2. A cover for a cooking vessel having in the top thereof a concave depression forming a valve seat with a centrally located through aperture therein, in combination with a closure member normally resting in the seat, the said closure member being constituted of two parts, the lower one of which is formed as a concavo-convex section, and the upper one of which is provided with a stud extended through the lower section to unite the two parts into a light, hollow body, and means connected to the closure member by the said stud for retaining the closure member in operative position with relation to the cover.

3. A cover for a cooking vessel having in the top thereof a depression forming a valve seat with a centrally located through aperture therein, in combination with a closure member normally resting in the said seat, the said closure member being constituted of two sections, the lower one of which is shaped to snugly fit the depressed valve seat, the upper section being provided with a stud passed through an opening in the lower section, to unite the sections and form a light, hollow body and means attached at the under side of the closure member to retain the closure member in operative position in relation to the cover.

In testimony whereof, I have signed my name at West Bend, this 10th day of April, 1928.

RALPH N. KIRCHER.